US 6,526,417 B1

(12) United States Patent
Perry (10) Patent No.: US 6,526,417 B1
(45) Date of Patent: Feb. 25, 2003

(54) SYSTEM AND METHOD FOR CHANGE ACCUMULATION UNMERGED UPDATE REDUCTION

(75) Inventor: Frederick Stephen Perry, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/491,002

(22) Filed: Jan. 25, 2000

(51) Int. Cl.[7] .............................................. G06F 17/30
(52) U.S. Cl. ...................................... 707/202; 707/204
(58) Field of Search .............................. 707/1, 100–101, 707/200–205; 714/100, 1–4, 37, 48–54, 798

(56) References Cited

U.S. PATENT DOCUMENTS

| | | | |
|---|---|---|---|
| 5,278,982 A | * 1/1994 | Daniels et al. | 707/202 |
| 5,280,611 A | 1/1994 | Mohan et al. | |
| 5,404,508 A | 4/1995 | Konrad et al. | |
| 5,455,946 A | * 10/1995 | Mohan et al. | 707/202 |
| 5,561,798 A | 10/1996 | Haderle et al. | |
| 5,721,918 A | * 2/1998 | Nilsson et al. | 707/202 |

OTHER PUBLICATIONS

"Change Accumulation Plus", Apr. 1999, pp. 1–2.
"The IDI ToolKit", Innovative DP Designs, Inc., Product Information Page, pp. 1–2.

* cited by examiner

Primary Examiner—Alford W. Kindred
(74) Attorney, Agent, or Firm—Madson & Metcalf (57) ABSTRACT

The present invention establishes a merge end point in logs reflecting a sharing session with a common database. The merge end point is established at an earlier point to thereby reduce the number of unmergeable records. The system of the present invention includes a log archive module which determines the position of each log volume end-start point in the logs. A database recovery control module receives the positions of the log volume end-start points and determines the most recent log volume end-start point for each log. The database recovery control module next determines which of the most recent log volume end-start points has the earliest time value. This log volume end-start point is the latest identifiable point wherein all log records for all logs will be committed and is selected as the merge end point. A change accumulation utility is able to incorporate the merge end point in a CADS to separate unmergeable and mergeable log records.

24 Claims, 5 Drawing Sheets

SYSTEM AND METHOD FOR CHANGE ACCUMULATION UNMERGED UPDATE REDUCTION

BACKGROUND OF THE INVENTION

1. Field of the Invention

The present invention relates generally to consolidating updates of database changes and, more specifically, to reducing the number of unmergeable records in a change accumulation data set.

2. Relevant Technology

Reliable management of databases is of paramount importance for modern day society which depends heavily on such databases for storage of critical information. Typically, users require that the database be constantly operational and accessible. Modern day database systems are substantially robust in that they infrequently experience a failure. Nevertheless, when a failure does occur the database recovery must be efficient and accurate to minimize loss to the users. Thus, database recovery is an operation which must be performed expeditiously in order to minimize down time for users. A database experiencing an extensive period of downtime may create an economic disaster.

A database contains database data sets and is managed by a complex database management system. One example of a database management system is the Information Management System (IMS) available from IBM Corp., Armonk, N.Y. The IMS is used extensively to serve a substantial number of databases in operation today. The IMS allows access to one or more databases in order for users to interact with the data maintained on the database. The majority of user access to a database involves transactional operations.

As users update database data sets in the database, the database management system records the updates in a log data set. The log data set is an amount of data, such as a file, which reflects a series of updates to the database. Log data sets are typically recorded in sequential records which have defined start and end points.

Users may make backup copies or a series of backup copies of the database periodically to assist in the recovery of a database. The backup copies may be recorded on tape archives by tape management systems. The backup copy is used as a base to restore the database to its state prior to a database failure. In recovery, subsequent updates to the database are applied from records on the log data sets. Recovery further requires storage of attributes of the database and the backup. Database management systems often include a repository which comprises several attributes of the database and the backup copy. Database management systems use some form of a repository relating to the database and the backup copy to assist in recovery.

Database management systems include a recovery utility to respond to a database failure. Upon database failure, the recovery utility creates a new database and writes the backup copy to the new database. The recovery utility further applies all updates to the database from when the backup copy was last created. Information used to restore the new database from the last state of the backup copy may be taken from the log data sets and recovery control information.

To assist in database recovery a utility, referenced herein as a change accumulation utility, accumulates updates and places them in a change accumulation data set (CADS). The CADS is an accumulation of changes in the log records that apply to the new database and are used as input during database recovery. The CADS may reflect updates for more than one database. A typical database record is updated a portion at a time and there may be overlapping updates which requires a sequential order of recovery. The change accumulation utility receives all the overlapping updates and incorporates the changes and merges overlapping updates.

In order to create the CADS, the change accumulation utility reads log data sets. Typically, users organize their multiple databases into change accumulation groups so that the change accumulation utility operates as efficiently as possible. A user can run the change accumulation process against one change accumulation group and use an optional secondary output—the set of log records that were not written to the change accumulation data set—as input to the change accumulation utility for the next change accumulation group to be processed. This can be done for each change accumulation group in which the current change accumulation run uses the secondary output of the previous change accumulation run. This serial process is managed directly by the user. Users usually run accumulation periodically so that when a database data set in a change accumulation group requires recovery, the time required to run a final change accumulation job and subsequent database recovery job is minimized. This sequential recovery process is quite complex.

The recovery utility reads the entire CADS into memory and applies that portion of the CADS that is relevant to the database data set being restored. Each record has an identification that's sequential and the database data sets are restored in a sequential order. The recovery utility addresses each record to see if there is a change in data for that record. If so, the CADS is accessed and the relevant record merged into the new database.

During routine operation, the database management system periodically creates updates in the database and in the log data set. Over time, several updates are created but are not permanently stored in the database until they are physically written on the database. In general, database activity is based on being able to "commit" updates to a database. A commit point is a point in time where updates become permanent parts of the database. The span of time between commit points is referred to as a "commit scope" or "unit of recovery" (UOR). If something goes wrong, such as a write error to the database, and the updates can not be made, all the updates produced since the last commit point are "aborted." It is as if the updates never happened.

One method for implementing database updates and commit point processing is for the database manager to maintain the database changes in storage and not apply the changes to the databases until the commit point is reached. A copy of the database data that is changed is written to the log as the update is created. When the commit point is reached, and all operations are as expected, the updates are written to the databases. If an error occurs, the storage containing the database updates is freed.

A common update to the database is termed a transaction which is a unitary logical piece of work that may include performing a variety of activities. At its simplest level a transaction may involve decreasing one account balance and increasing another. The activities performed in the transaction may extend beyond a first commit point and will not be permanent until a subsequent commit point.

The change accumulation utility creates the CADS by taking log data sets that have been committed up to a certain commit point by combining them together. The committed log data sets are readily applied to the new database during recovery because they are permanent. Updates that occur after the last recorded commit point are not readily applied to the new database because there is no guarantee that the updates will be committed at a later commit point. Failure of a commit point results in an abort of the update and any related transactions. If the updates need to be aborted, the log record is retrieved and the copies of the unchanged database data are applied, in effect backing out the changes. Thus, updates that occur after the commit point are not necessarily committed to the database.

Each CADS comprises a detail record which is a record of committed updates from one or more logs. Each detail record is a series of contiguous bytes which can be overlaid into the backup copy of one database physical record. Applying all of the detail records in the CADS is equivalent to rerunning all of the transactions against the data base which were entered since a backup copy was made up to a "merge-end point." The merge-end point is a point in the log separating mergeable updates from updates which may not be merged into detail record because all change records are not available for these updates. In shared sessions, merge end points are established at the location of sharing session boundaries such as at the end of a completed sharing session.

Updates which cannot be merged are written to records which are termed "spill records." Spill records can only occur in a sharing session when multiple database management systems are sharing a database. The majority of database management systems run in a shared session to maximize use of a database. Spill records contain update data stored in the CADS in their entirety as individual identities and are not as compact as merged detail records. When the relevant log records become available, the spill records may be read in a subsequent change accumulation process and may be merged with other updates. Because updates contained in spill records are not merged, they increase the size of a CADS which in turn increases the amount of time needed to read and process a CADS. Reducing the number of spill records reduces the size of the CADS and improves the processing time of database recovery and subsequent change accumulation processes.

Thus, it would be an advancement in the art to provide a system and method to reduce the number of spill records in a CADS. It would be a further advancement in the art to reduce the number of spill records in a CADS by establishing a merge end point at a later position in commonly shared logs. It would be yet another advancement in the art to reduce the number of spill records by incorporating known features in database systems. Such an invention is disclosed and claimed herein.

SUMMARY OF THE INVENTION

The invention establishes a merge end point in the logs of a plurality of database management systems which share a common database. The merge end point is established at a later point to thereby reduce the number of unmergeable records. The system of the present invention comprises a log archive module which determines the location of each log volume end-start point in the logs. A log volume end-start point is the approximate position wherein the medium storing the log records is filled and is switched. Thus, the current medium, such as a tape, ends and a new medium starts at the end-start point. The log archive module assigns a time value to each log volume end-start point to indicate their positions.

The invention further comprises a database recovery control module which receives the positions of the log volume end-start points. The database recovery control module determines the most recent log volume end-start point for each log. The database recovery control module next determines which of the most recent log volume end-start points has the minimum time value. This log volume end-start point is the latest identifiable point wherein all log records for all logs may be merged. This log volume end-start point is selected as the merge end point. Thus, the merge end point need not be selected at the end of a completed sharing session. A change accumulation utility is able to incorporate the merge end point in a CADS to separate updates between those that are merged in the detail and those that are stored in the spill records.

These and other objects, features, and advantages of the present invention will become more fully apparent from the following description and appended claims, or may be learned by the practice of the invention as set forth hereinafter.

BRIEF DESCRIPTION OF THE DRAWINGS

These and other more detailed and specific objects and features of the present invention are more fully disclosed in the following specification, with reference to the accompanying drawings, in which.

DETAILED DESCRIPTION OF THE PREFERRED EMBODIMENTS

A preferred embodiment of the invention is now described with reference to the Figures, where like reference numbers indicate identical or functionally similar elements. The components of the present invention, as generally described and illustrated in the Figures, may be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Various components of the invention are described herein as "modules." In one embodiment, the modules may be implemented as software, hardware, firmware, or any combination thereof.

For example, as used herein, a module may include any type of computer instruction or computer executable code located within a memory device and/or transmitted as electronic signals over a system bus or network. An identified module may, for instance, comprise one or more physical or logical blocks of computer instructions, which may be organized as an object, procedure, function, or the like.

Nevertheless, the identified modules need not be located together, but may comprise disparate instructions stored in different locations, which together implement the described functionality of the module. Indeed, a module may comprise a single instruction, or many instructions, and may even be distributed over several different code segments, among different programs, and across several memory devices.

Figure 1:
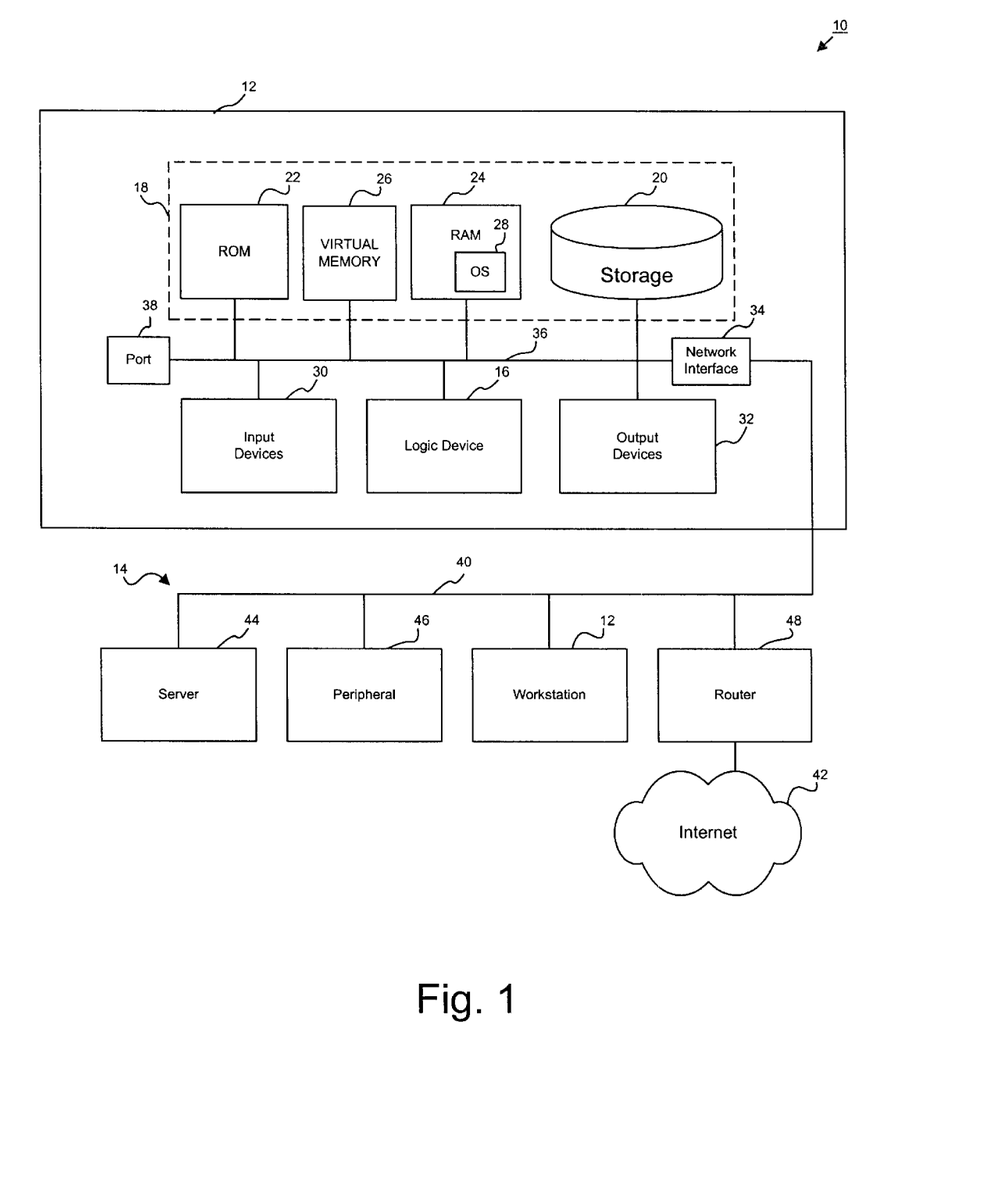
FIG. 1 is a block diagram of a computer system suitable for implementing one embodiment of the invention.

FIG. 1 is a schematic block diagram illustrating a computer system 10 in which a plurality of modules may be hosted on one or more computer workstations 12 in a network 14. The network 14 may comprise a wide area network (WAN) or local area network (LAN) and may also comprise an interconnected system of networks, one particular example of which is the Internet.

A typical computer workstation 12 may include a logic device 16 and may be embodied as a central processing unit (CPU), microprocessor, a general purpose programmable device, application specific hardware, a state machine, or other processing machine. The logic device may be operably connected to one or more memory devices 18. The memory devices 18 are depicted as including a non-volatile storage device 20, such as a hard disk drive, CD-ROM drive, tape drive, or any other suitable storage device. The memory devices 18 may further include a read-only memory (ROM) 22, and a random access volatile memory (RAM) 24. The RAM 24 may be used to store instructions by the logic device 16 during execution. The memory devices 18 may further include a virtual memory 26 which, in one embodiment, is a portion of the non-volatile storage 20 which is used to extend the RAM 24.

Preferably, the computer workstation 12 operates under the control of an operating system (OS) 28, such as OS/2, WINDOWS NT, WINDOWS 98, UNIX, or the like. In one embodiment, the operating system 28 may be loaded from the storage 20 into the RAM 24 at the time the workstation 12 is booted.

The computer workstation 12 may also include one or more input devices 30, such as a mouse or keyboard, for receiving inputs from a user. Similarly, one or more output devices 32, such as a monitor or printer, may be provided within, or be accessible from, the workstation 12.

A network interface 34, such as an Ethernet card, may be provided for coupling the workstation 12 to other devices via the network 14. Where the network 14 is remote from the computer workstation 12, the network interface 30 may comprise a modem, and may connect to the network 14 through a local access line, such as a telephone line.

Within any given workstation 12, a system bus 36 may operably interconnect the logic device 16, the memory devices 18, the input devices 30, the output devices 32, the network interface 34, and one or more additional ports 38, such as parallel ports and RS-232 serial ports.

The system bus 36 and a network backbone 40 may be regarded as data carriers. Accordingly, the system bus 36 and the network backbone 40 may be embodied in numerous configurations. For instance, the system bus 36 and the network backbone 40 may comprise wire and/or fiber optic lines, as well as "wireless" electromagnetic links using visible light, infrared, and radio frequencies.

In general, the network 14 may comprise a single local area network (LAN), a wide area network (WAN), several adjoining networks, an intranet, or as in the manner depicted, a system of interconnected networks such as the Internet 42. The individual workstations 12 may communicate with each other over the backbone 40 and/or over the Internet 42 using various communication techniques. Thus, a communication link may exist in general, between any of the stations 12.

Different communication protocols, e.g., ISO/OSI, IPX, TCP/IP, may be used within the network 14, but in the case of the Internet 42, a single, layered communications protocol (TCP/IP) generally enables communications between the differing networks 14 and workstations 12.

The workstations 12 may be coupled via the network 14 to application servers 44, and/or other resources or peripherals 46, such as printers, scanners, and facsimile machines. External networks may be coupled to the network 14 through a router 48 and/or through the Internet 42.

Figure 2:
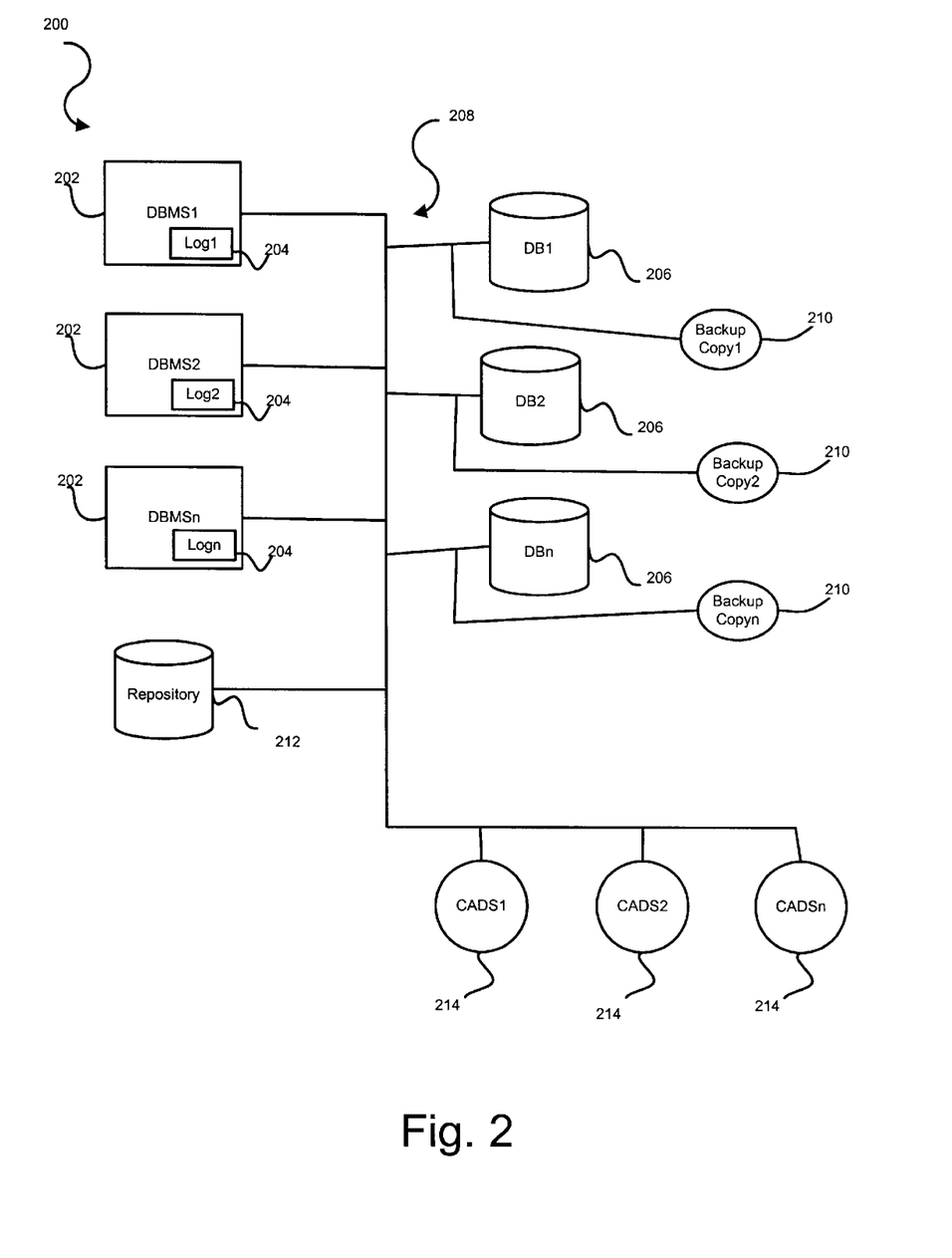
FIG. 2 is a block diagram of components illustrating communications and interconnections between components for a database system.

Referring to FIG. 2, a block diagram illustrates a database system 200 which provides an environment for operation of the invention. The database system 200 may comprise one more database management systems (DBMS) 202. The DBMSs 202 are designated DBMS1 to DBMSn to indicate a variance of DBMSs 202 in the database system 200. The DBMS 202 may be incorporated on a station 12 illustrated in FIG. 1. An example of a DBMS 202 suitable for use with the invention is the Information Management System (IMS) previously discussed. One of skill in the art will appreciate that other database management systems may be incorporated into the present invention.

Each DBMS 202 may include a log 204 having log records to track updates to data kept in memory 18 or in a database (DB) 206. The log 204 is used for reference to track data changes and other events performed by the corresponding database management system 202. The log 204 may be stored on one or more memory devices 18 of the station 12.

The database system 200 further includes one or more DBs 206 having one or more database data sets. The DBs 206 are designated as DB1 to DBn to illustrate a variance in the number of DBs 206 in the system 200. The DBs 206 may be a hierarchial structured database, such as an IMS database, but may comprise a relational database in an alternative embodiment. Throughout the application, reference to DBs 206 or database data sets is used interchangeably.

Each DBMS 202 may allow access to one or more DBs 206 in order for users to interact with any data maintained on the DBs 206. One or more DBMSs 202 may also serve a single DB 206. This is common practice as the size of DBs 206 often require more than one DBMS 202 to efficiently manage the transactions. A sharing session occurs when a plurality of DBMS 202 concurrently access a DB 206.

The interconnection of the DBMS 202 and DBs 206 is designated by an electrical communication 208. The electrical communication 208 may be considered a data carrier and may be embodied as the network backbone 40. Electrical communication 208 does not require that components be physically coupled to each other. The electrical communication 208 may be enabled by electromagnetic, infrared, or other wireless communications. Furthermore, as database systems 200 vary in implementation, FIG. 2 is for illustrative purposes only as not every system 200 will have DBMSs 202 in communication with multiple DBs 206. For purposes of the invention it is sufficient that there be a plurality of DBMS 202 in electrical communication with one DB 206.

Database recovery methods require that a DB 206 have a corresponding backup copy 210 which may be a physical or logical copy. In one embodiment, the backup copy 210 is stored on a magnetic tape drive although other means of storage may also be used. The backup copy 210 reflects the contents of the DB 206 up to a certain time and serves as a starting point for the database recovery process. However, the backup copy 210 is not a complete repository of data of the DB 206 and other data is required to complete database recovery as explained below. The backup copy 210 may be in electrical communication 208 with other components of the system 200 as required for recovery.

The database system 200 further includes a repository 212 of recovery related information. The repository 212 is used to store information required to recover lost data if a media failure or another type of inadvertent error occurs. For example, hardware within a system may unexpectedly fail or a user may have accidentally inputted defective data or instructions that led to inconsistency in one or more DBs 206. The repository 212 comprises data sets containing database recovery related information that may be specific to each DB 206 used in the system 200. The repository 212 is in electrical communication 208 with other components of the system 200 as required to update and access the data sets in the repository 212.

Each DB 206 to be recovered may be specified in a recovery list by designating one or more database data sets, designating entire DBs 206 for recovery, or designating groups as defined in the repository 212 for recovery. These groups may comprise, for example, database data set groups or other types of database groups.

The database system 200 comprises one or more CADS 214 designated CADS1 to CADSn to indicate a variance in the number of CADS 214 in the system 200. Each CADS 214 contains records reflecting change data from one or more logs 204 for a certain span of time. A single CADS 214 may further reflect updates for one or more databases 206. The CADS 214 may be in electrical communication 208 with other components as required for recovery of one or more databases 206.

Figure 3:
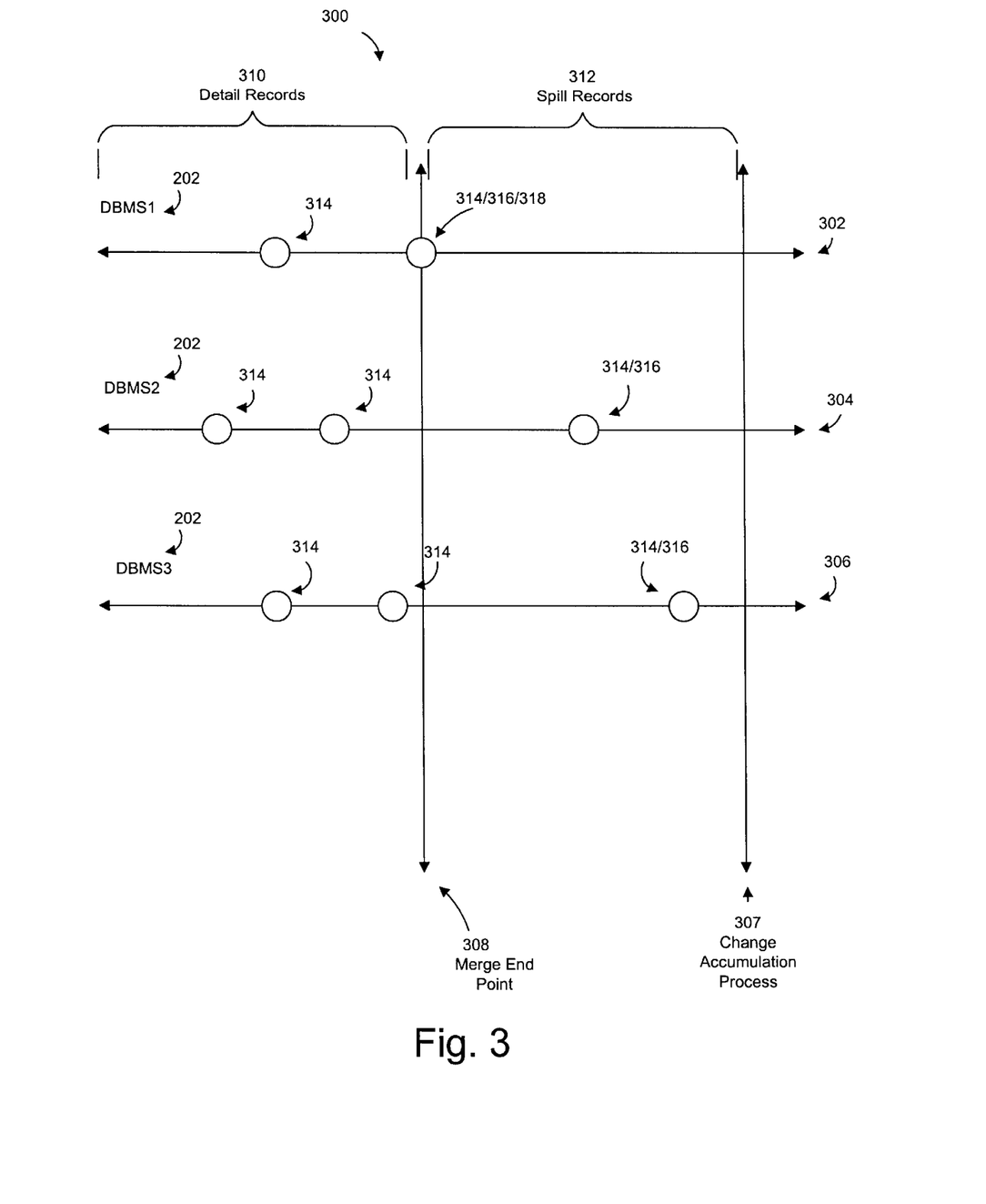
FIG. 3 is an illustration of log time lines used for reference with the present invention.

Referring to FIG. 3, time lines 302, 304, 306 illustrating events in various logs corresponding to DBMS1–3 202 are shown. FIG. 3 is used to illustrate the concept and advantages of the present invention. The timelines 302, 304, 306 represent allocation of a single database 206 to a plurality of DBMSs 202. Practice of the invention is contemplated for a sharing session wherein two or more DBMSs 202 concurrently access a database 206.

At a certain time in the time lines, a change accumulation process 307 is performed to merge log records and create a CADS 214. In the change accumulation process 307, a merge end point 308 is required for all logs of DBMSs 202 allocated to a database 206. A merge end point 308 is a time separating log update records 310, which may be merged into detail records, and log update records 312 which may not be merged. Unmergeable log update records 312 are written to spill records. Unmergeable log update records 312 must be stored in the CADS 214 with their individual identities as individual update records. Thus, spill records 312 are not as compact as merged detail records 310. The more spill records 312 in a CADS 214, the greater amount of time that is required to read and process the CADS 214. This in turn increases the amount of database recovery time. Reducing the number of spill records 312 reduces the size of the CADS 214 and can improve the efficiency of a database recovery or subsequent change accumulation process.

Conventionally, the merge end points 308 always coincided with sharing session boundaries. The location of the merge end point 308 may be reflected by the DSSN (Data Set (allocation) Sequence Number). The DSSN is updated whenever a DB 206 is allocated for use by a DBMS 202, unless the DB 206 is in current use by another DBMS 202. Thus, the merging of updates is only possible for completed sharing sessions.

The present invention reduces the number of updates written to the spill records, comprising unmergeable update data, which are written to a CADS 214. This is accomplished in part by identifying the latest point to which log records are available to be merged. The invention requires the identification of log volume end-start points 314 in each log 302, 304, 306. A log volume end-start point 314 is the approximate position in a log where the medium storing the log records is filled and must be replaced by another medium. The medium may be a computer readable tape or other computer readable storage medium. Thus, the log volume end-start point indicates where the current medium ends its storage and a new medium starts its storage. The log archive module assigns a time value to each log volume end-start point to indicate their positions The most recent log volume end-start points 316 are identified for each log 302, 304, 306. Log records transpiring after the most recent log volume end-start point 316 on each log are not available to be processed. Thus, in FIG. 3, log 302 contains the greatest number of unmergeable log records. The merge end point 308 must coincide with all logs 302, 304, 306 in the sharing session and allocated to a DB 206. The minimum time position of the most recent log volume end-start points 316 is the latest point available for the merge end point 308. In FIG. 3, end-start point 318 is the minimum of the most recent end-start points 316 and is established as the location for the merge end point 308. All available log records occurring after the end-start point 318 are written to spill records and all log records occurring prior to end-start point 318 are merged in the detail records. In this manner, the mergeable records are obtained as far down stream in the log time lines as possible. The merge end point 308 need no longer be dictated by sharing session boundaries.

Figure 4:
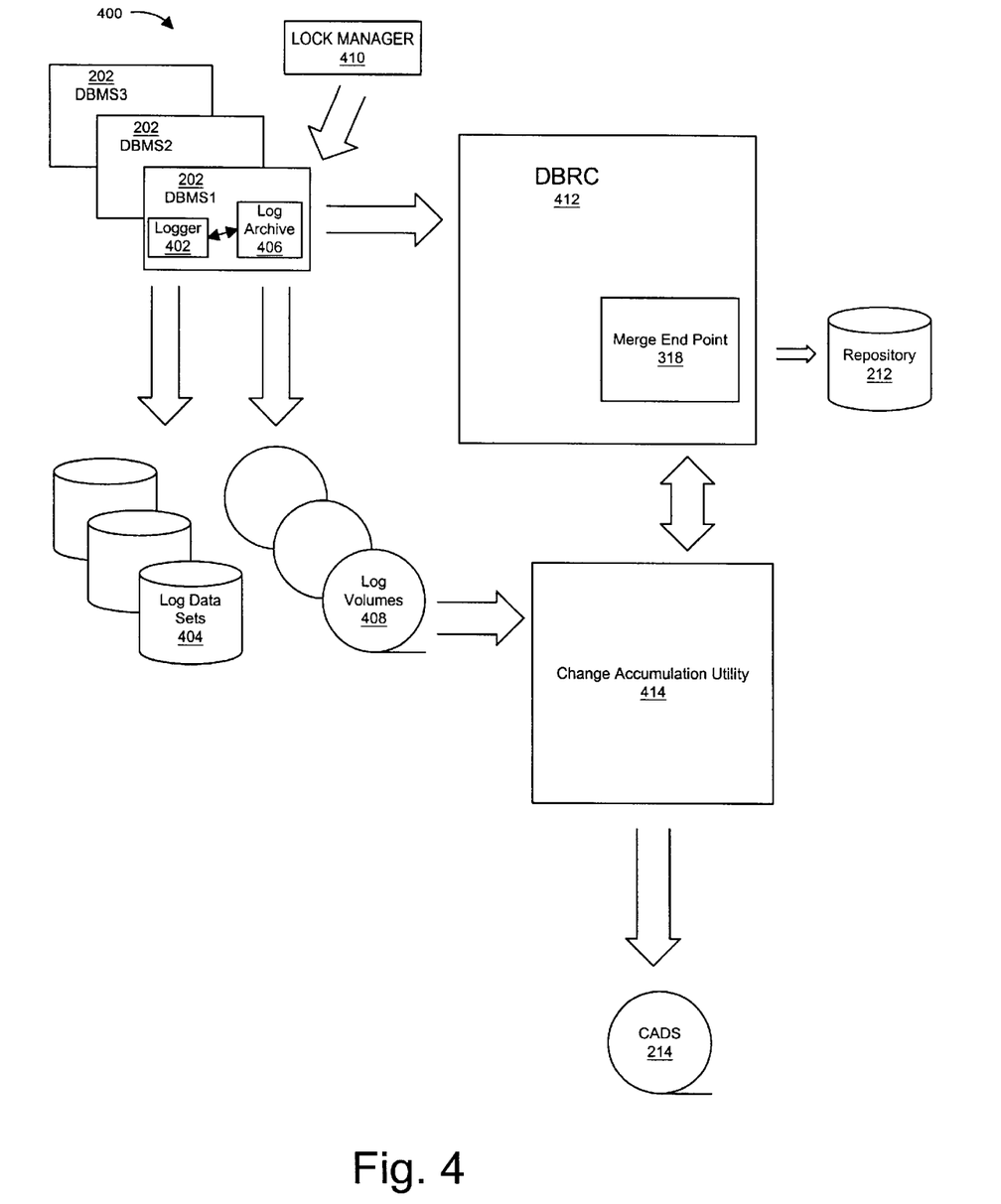
FIG. 4 is a block diagram illustrating one embodiment of a system for reducing unmergeable records in accordance with one embodiment of the invention.

Referring to FIG. 4, one embodiment of a system 400 having modules is shown. The memory devices 18 in which the modules of the present invention are located may be located in a single computer station 12 or may be distributed across both local and remote computer stations 12. Two or more illustrated modules may be integrated into a single module without departing from the scope of the invention.

The system 400 contains one or more DBMSs 202 represented as DBMS1-3 in FIG. 4. Each DBMS 202 comprises a logger 402 which manages the writing of log data sets 404. As a log data set 404 is completed it is sent to a log archive 406. The log archive 406 writes the log data set 404 out to be logged on a log volume 408. As the log data sets 404 are created, they take space on the log volume 408. When a log volume 408 is full, the log archive 406 provides an identifier of the log volume end-start point 314. As referenced herein, the log archive 406 may be specific to a single DBMS 202 or may be utilized by multiple DBMSs 202. Thus, a log archive module 406 may include one or more modules resident within one or more DBMSs 202.

The identifier for the log volume end-start point 314/316 is a value such as a time stamp to track the current position of log volume end-start point 314 in the log of the corresponding DBMS 202. In one embodiment, the value is both the current DSSN and Lock Sequence Number (LSN). The LSN is generated by a lock manager 410 and is used to confirm the lock of a log record on a DB 206 for updates to the log record. The lock manager 410 may provide the LSN for a plurality of DBMSs 202 relating to a DB 206. In the present invention, the LSN is also used to track the log position of the log volume start point 314. The LSN is only reset to zero in synchronization with an increment of all DSSN values, i.e. when no DB 206 is allocated. The DSSN value is only incremented when a DB 206 is allocated for use by a DBMS 202 when it is not concurrently in use by another DBMS 202.

The log archive 406 obtains a database synchronization token from the last log data set 404 of an archived log volume 408. The database synchronization token reflects a DSSN/LSN value. The DSSN/LSN value is sent to a database recovery control (DBRC) 412. The DBRC 412 obtains the DSSN/LSN values which indicate the log volume end-start point 314 for each log volume 408. The DBRC 412 stores the DSSN/LSN values in the repository 212.

The DBRC 412 evaluates the log volume end-start points 314 to select the log volume end-start point 316 which is most recent for each DBMS 202. The DBRC 412 then selects from the most recent log volume end-start points 316 the minimum volume end point to be the merge end point 308. The DBRC 412 may update the merge end point 308 each time a log volume end-start point 318 is received. In this manner, the merge end point 308 is available at any time. The DBRC 412 sends the DSSN/LSN value reflecting the merge end point 308 to a change accumulation utility 414.

Previously, the change accumulation utility 414 received only a DSSN value to reflect the location of the merge end point 308. In the present invention, the change accumulation utility 414 uses a DSSN/LSN value to determine the merge end point 308. The change accumulation utility 414 reads in the log volumes 408 and uses the merge end point to distinguish mergeable update records 310 from unmergeable records 312 in the creation of a CADS 214.

For clarification, the disclosure of the present invention was in reference to a single DB 206 allocated to a plurality of DBMSs 202. The invention also allows for the DBRC 412 and change accumulation utility 414 to accommodate the allocation of a plurality of DBs 206 to a plurality of DBMSs 202. The DBRC 412 receives an indication that each log volume end-start point 314 relates to a specific log volume 408 for a specific DB 206. The change accumulation utility 414 further reads log volumes 408 associated with each DB 206 for which the change accumulation process is to be performed. Thus, when the change accumulation utility 414 performs the change accumulation process for multiple DBs 206, the DBRC 412 will send multiple merge end points 308 to the change accumulation utility 414.

Figure 5:
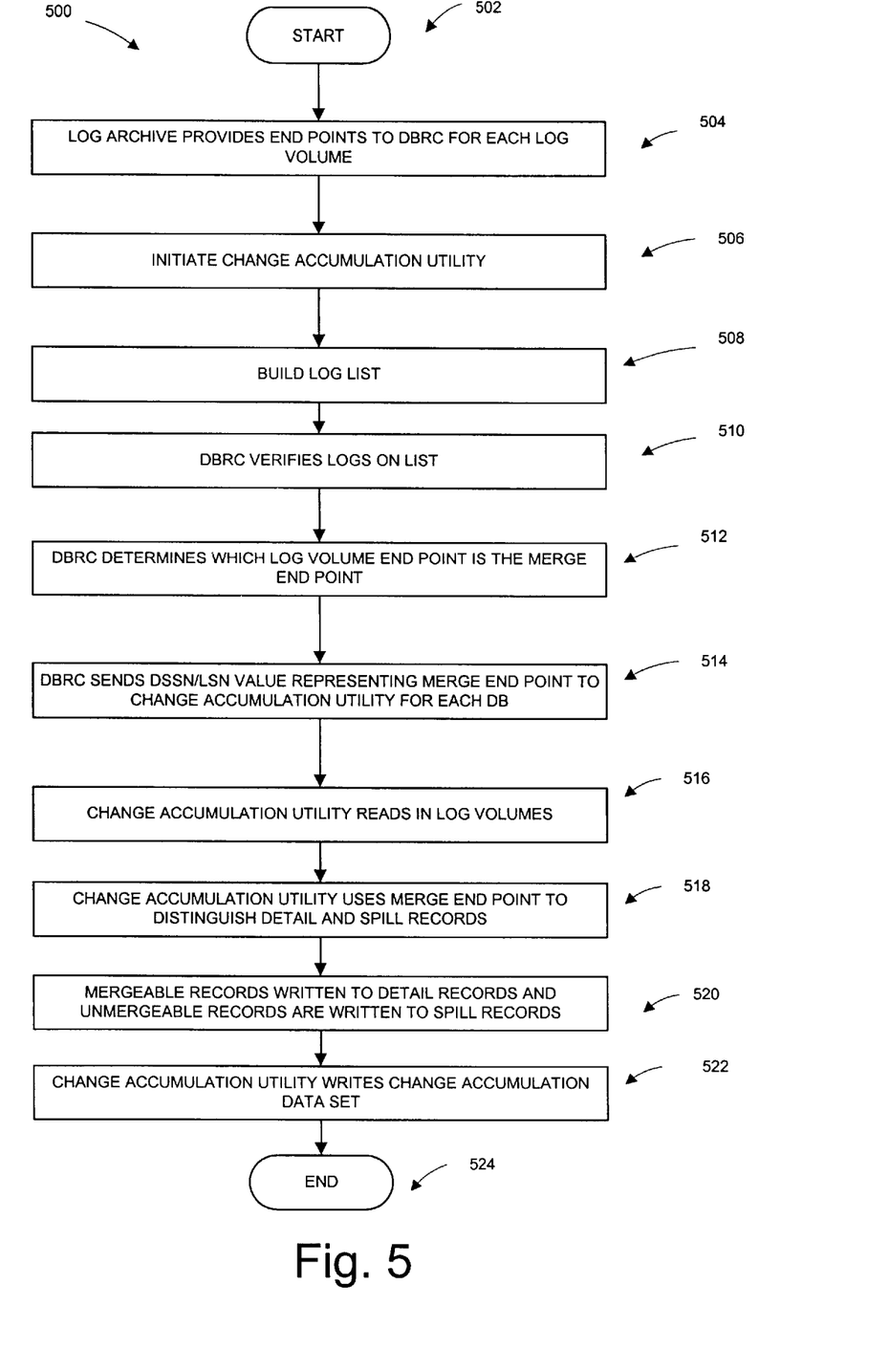
FIG. 5 is a flow diagram illustrating one embodiment of a method for reducing unmergeable records.

Referring to FIG. 5, one embodiment of a method 500 for use with the present invention is shown. In step 502, the method begins. In step 504, the log archive 406 provides the log volume end-start points 314 to the DBRC 412 for each completed log volume. Step 504 may be repeated numerous times throughout the process as log volumes are filled. Thus, the DBRC 412 may receive updated information regarding new log volume end-start points 314.

In step 506, the change accumulation utility 414 is invoked to commence the change accumulation process for one or more DBs 206. This may be performed automatically based on preestablished parameters or through initiation by a user.

In step 508, the user or the DBRC 412 builds a log list of log volumes which are associated with the DBs 206 for which the change accumulation process will be run. The change accumulation utility 414 sends the log list to the DBRC 412 to verify the logs which will undergo the change accumulation process.

In step 510, the DBRC 412 confirms the logs and sends verification of the logs to the change accumulation utility 414.

In step 512, the DBRC 412 determines which of the log volume end-start points 314 associated with a specific DB 206 is the current merge end point 308 for that DB 206. This step may be performed as new log volume end-start points 314 are received. DBRC 412 determines the current merge end point 308 when a request for the merge end point 308 is received from the change accumulation utility 414.

In step 514, the DBRC 412 sends a value reflecting the merge end point 308 to the change accumulation utility 414 for each DB 206. In the present embodiment, the value is a DSSN/LSN value. Nevertheless, one of skill in the art will appreciate that other time sensitive values which reflect the merge end point 308 position in a log may also be used and are included within the scope of the invention.

In step 516, the change accumulation utility 414 reads in the log volumes associated with each DB 206.

In step 518, the change accumulation utility 414 uses the merge end point 308 to distinguish mergeable and nonmergeable update records 310, 312 in the creation of a CADS 214.

In step 520, the mergeable update records are merged with detail records 310 and unmergeable update records are written to spill records 312.

In step 522, the change accumulation utility 414 writes out the CADS 214. In step 524, the method concludes.

The present invention reduces the number of unmergeable log records by selecting the lastest merge end point 308 corresponding to the logs of DBMSs 202. The DSSN/LSN value is used to accurately track the merge end point 308. In most cases, the present invention will significantly reduce the number of changes written to spill records 312. The more log records which are processed and merged into the CADS, the fewer which must be read and sorted by a subsequent change accumulation or recovery process. Thus, the present invention increases the number of mergeable updates 310 incorporated into detail records to thereby expedite any future accumulation or recovery.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for establishing a merge end point in the logs of a plurality of database management systems sharing a database to thereby reduce the number of unmergeable records, the system comprising:

a log archive module configured to store a plurality of log volumes corresponding to the plurality of database management systems and derive a value corresponding to each log volume end-start point for each log volume; and a database recovery control module configured to receive and store the values corresponding to the log volume end-start points and derive the most recent log volume end-start point for each database management system, and derive the minimum log volume end-start point from the most recent log volume end-start points to thereby determine the merge end point.

2. The system of claim 1 further comprising a change accumulation utility module configured to receive the merge end point and incorporate the merge end point in a change accumulation process to thereby separate mergeable and nonmergeable update records into detail and spill records.

3. The system of claim 1 wherein the values comprise data set sequence numbers corresponding to the log volume end-start points.

4. The system of claim 3 wherein the values further comprise lock sequence numbers corresponding to the log volume end-start points.

5. The system of claim 4 further comprising a lock manager configured to provide lock sequence numbers to the log archive.

6. The system of claim 4 wherein the log archive module is configured to retrieve data set sequence numbers and lock sequence numbers indicative of log volume end-start points.

7. The system of claim 1 further comprising a logger module configured to write log records to each log volume.

8. The system of claim 7 wherein the logger module is further configured to provide a lock sequence number indicative of a log volume end-start points to the database recovery control module.

9. The system of claim 1 further comprising a repository module for storing data set sequence numbers and lock sequence numbers corresponding to log volume end-start points.

10. The system of claim 1 wherein the change accumulation utility is further configured to request a verification from the database recovery control module of logs to incorporate into the change accumulation data set.

11. A method for establishing a merge end point in the logs of a plurality of database management systems sharing a database to thereby reduce the number of unmergeable records, the method comprising:
   processing a plurality of log volumes corresponding to the plurality of database management systems to derive log volume end-start points for each log volume;
   determining the most recent log volume end-start point for each database management system; and
   determining the least recent log end-start point for currently unavailable log records to thereby determine the merge end point.

12. The method of claim 11 further comprising incorporating the merge end point into a change accumulation process to thereby separate detail and spill records.

13. The method of claim 12 further comprising compiling and verifying a list of log volumes to be incorporated into the change accumulation data set.

14. The method of claim 12 further comprising reading log volumes to be incorporated into the change accumulation data set.

15. The method of claim 11 wherein processing the log volumes further comprises deriving data set sequence numbers corresponding to the log volume end-start points.

16. The method of claim 11 wherein processing the log volumes further comprises deriving lock sequence numbers corresponding to the log volume end-start points.

17. The method of claim 11 further comprising deriving data set sequence numbers and lock sequence numbers from last log records in the log volumes to thereby establish log volume end-start points.

18. A computer readable medium having stored thereon computer executable instructions for performing a method for establishing a merge end point in the logs of a plurality of database management systems sharing a database to thereby reduce the number of unmergeable records, the method comprising:
   processing a plurality of log volumes corresponding to the plurality of database management systems to derive log volume end-start points for each log volume;
   determining the most recent log volume end-start point for each database management system; and
   determining the minimum log volume end-start point from the most recent log volume end-start points to thereby determine the merge end point.

19. The computer readable medium of claim 18 wherein the method further comprises incorporating the merge end point into a change accumulation data set to thereby separate mergeable updates from unmergeable updates.

20. The computer readable medium of claim 19 wherein the method further comprises compiling and verifying a list of log volumes to be incorporated into the change accumulation data set.

21. The computer readable medium of claim 19 wherein the method further comprises reading log volumes to be incorporated into the change accumulation data set.

22. The computer readable medium of claim 18 wherein processing the log volumes further comprises deriving data set sequence numbers corresponding to the log volume end-start points.

23. The computer readable medium of claim 18 wherein processing the log volumes further comprises deriving lock sequence numbers corresponding to the log volume end-start points.

24. The computer readable medium of claim 18 wherein processing the log volumes further comprises deriving data set sequence numbers and lock sequence numbers from last log records in the log volumes to thereby establish log volume end-start points.

* * * * *